United States Patent
Waibel et al.

(10) Patent No.: US 6,609,815 B1
(45) Date of Patent: Aug. 26, 2003

(54) LASER ARRANGEMENT FOR A MULTI-BEAM LASER SIGHTING MECHANISM

(75) Inventors: Reinhard Waibel, Berneck (CH); Wilfried Piske, Heerbrugg (CH); Erwin Bünter, Eichberg (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/644,616

(22) Filed: Aug. 23, 2000

(51) Int. Cl.$^7$ .............................. F21K 7/00; G02B 27/00
(52) U.S. Cl. ...................... 362/259; 362/244; 359/618; 359/629
(58) Field of Search ................................ 362/259, 297, 362/298, 346, 339, 328, 237, 241, 244, 247; 359/618, 629, 634, 636

(56) References Cited

U.S. PATENT DOCUMENTS

| | | | | |
|---|---|---|---|---|
| 5,715,102 A | * | 2/1998 | Chao et al. | 359/833 |
| 5,825,555 A | | 10/1998 | Oono et al. | 359/668 |
| 6,154,319 A | * | 11/2000 | Rando et al. | 359/618 |
| 6,259,560 B1 | * | 7/2001 | Scheps | 359/485 |

FOREIGN PATENT DOCUMENTS

EP           0543115           5/1993

OTHER PUBLICATIONS

Patent Abstract of Japan 05 27 2967.

Patent Abstract of Japan61 01 3211.

* cited by examiner

*Primary Examiner*—Sandra O'Shea
*Assistant Examiner*—Guiyoung Lee
(74) *Attorney, Agent, or Firm*—Sidley Austin Brown & Wood, LLP

(57) ABSTRACT

A laser arrangement for use in a multi-beam laser sighting mechanism, which comprises a light source for producing at least one primary laser beam bundle and an optical beam divider with reflecting surfaces, by which at least one primary laser beam bundle can be split into at least two partial beam bundles, which extend perpendicularly to one another. The light source comprises two semiconductor lasers including light-emitting surfaces which have a longitudinal extent and a transverse extent, which are in a ratio of about 2.5:1 to about 4:1 to one another. The light-emitting surfaces of the semiconductor lasers are disposed so that the longitudinal extents of the light-emitting surfaces are rotated at an angle of 90° to one another and the primary beam bundles, which are produced by the two semiconductor lasers, can be superimposed before or at the beam divider.

10 Claims, 2 Drawing Sheets

LASER ARRANGEMENT FOR A MULTI-BEAM LASER SIGHTING MECHANISM

FIELD OF INVENTION

The invention relates to a laser arrangement for a multi-beam laser sighting mechanism, which comprises a light source for producing at least one primary laser beam bundle and an optical beam divider with reflecting surfaces for splitting at least one primary laser beam bundle into at least two partial beam bundles.

BACKGROUND INFORMATION AND PRIOR ART

In the building industry, the long-known mechanical devices, which make alignment and measurement of the positional accuracy of building components, assemblies, installations and the like possible, are increasingly being replaced by optical devices, which are based on a high intensity collimated bundle of light rays. Since the semiconductor makes large numbers of laser diodes available with radiation in the visible spectrum, usually in the red region of the spectrum, a series of measuring devices has become known in the building industry, which replace the previously dominating mechanical, visual devices and methods and, moreover, also additionally offer new measurement possibilities. For example, sighting mechanisms, which send out at least one collimated laser beam bundle, which has a diameter of not more than 10 mm at a distance of 20 m and a deviation of about 1 mm/10 m in the horizontal direction have gained much acceptance. The laser beam bundle is usually aligned automatically in the horizontal direction by gravity-affected constructions or control circuits.

Aside from the horizontal alignment and leveling, there is frequently also the need to provide a plumb bob or to mark off a precise right angle. For this purpose, for example, U.S. Pat. No. 5,144,482 discloses a laser device, which emits three laser beam bundles, which lie in a horizontal plane and extend at right angles to one another. Additionally, the device emits two plumb bob beams. An arrangement of mirrors is provided within the device to produce the horizontal and perpendicular laser beam bundles. This arrangement of mirrors deflects the primary-laser beam bundle, originating from a laser diode, in the desired directions. The deflecting mirrors, for producing the total of five horizontal and vertical beam bundles, are disposed at a spatial distance from one another in the beam path of the primary laser beam bundle.

Consequently, a zero offset results for the three-dimensional coordinate system, put up by the emitting laser beam bundles, because the perpendicular beam bundles and the horizontal beam bundles have different virtual origins. Until now, the manufacturers of such laser beam devices, made do by providing a round gauge of, for example, 20 mm for this zero offset. For measurements with such laser devices, the zero offset must always be taken into consideration. In use, this represents a considerable source of errors. Due to the splitting of the primary laser beam bundle, coming from the light source, the intensity, remaining for the individual partial beam bundles, is greatly reduced. Admittedly, an attempt is made to provide a remedy for this disadvantage by using a laser light source of appropriately high output. This solution is hardly economically feasible, since the costs of laser diodes increase disproportionately to the power emitted. It is sometimes also desirable to produce partial beams in different colors. This, however, is not possible with conventional commercial equipment.

OBJECT OF THE INVENTION

It is therefore an object of the present invention to provide economically feasible and practical solutions to these disadvantages of laser sighting mechanisms of prior art. The laser arrangement for a multi-beam laser sighting mechanism in accordance with the present invention indicates an optical system of coordinates, for which a zero offset is avoided. At the same time, this arrangement produces partial beam bundles having a sufficient intensity, so that even readings over larger distances are possible. This arrangement also produces partial beam bundles with different colors, without having to put up with losses in light intensity.

SUMMARY OF THE INVENTION

These objectives are accomplished by a laser arrangement for a multi-beam laser sighting mechanism, in accordance with the present invention. The inventive laser arrangement is constructed for use in a multi-beam laser sighting mechanism, which comprises a light source for producing at least one primary laser beam bundle and an optical beam divider with reflecting surfaces, by means of which the at least one primary laser beam bundle can be split into at least two partial beam bundles extending at right angles to one another. Pursuant to the invention, the light source comprises two semiconductor lasers, the light-emitting surfaces of which have a length extent and a transverse extent in a ratio of about 2.5:1 to about 4:1. The semiconductor lasers are disposed with their light-emitting surfaces such that the longitudinal dimensions of the light-emitting surfaces are rotated at an angle of 90° to one another and the primary beam bundles, produced by the two semiconductor lasers, can be superimposed at a position before or at the beam divider.

A laser beam, emitted from a semiconductor laser, has an elliptical beam geometry, which is a consequence of the rectangular shape of the light-emitting surface of the layer of the semiconductor laser, producing the laser light. Due to the arrangement of the semiconductor laser that has been selected, with light-emitting surfaces rotated at an angle of 90° to one another, the total laser beam bundle of the two superimposed elliptical primary beam bundles has essentially a star-shape, which results from the two ellipses rotated at an angle of 90° to one another. As a result, the total beam bundle has an essentially symmetrical shape, which meets the geometric requirements of the beam divider. By superimposing the primary beam bundles of two semiconductor lasers, semiconductor lasers with low powers can also be used as a light source to produce a sufficiently high light intensity. Failure of one of the semiconductor lasers does not result in the total failure of the laser sighting mechanism; instead, it can still be used to a limited extent. As a result, the economic efficiency and the availability-of the laser sighting mechanism are further improved. Semiconductor lasers with different outputs and different wavelengths can also be used as light sources. As a result, interesting possibilities arise for varying the laser sighting mechanism with respect to the laser beams emitted. In the case of a three-dimensional laser sighting mechanism, for example, the at least three laser beams, setting up the Cartesian coordinate system, can have different colors. The user, therefore, can also get his bearings by relying on the-color of the projected marking.

To further improve the beam geometry and to improve the adaptation to the requirements of the beam divider, one or more beam-forming elements can be disposed at least between one of the semiconductor lasers and the beam divider.

In one embodiment of the laser arrangement, the light-emitting surfaces of the semiconductor lasers are disposed perpendicularly to one another. The two emitting primary beam bundles are directed onto a semitransparent mirror, which is disposed between the semiconductor lasers and the beam divider and inclined at an angle of 45° to the direction of dispersion of the two primary beams and superimposed there into a total primary beam bundle. The selected arrangement is easily implemented and, aside from a semitransparent mirror, does not require any further optical elements of special construction. For the arrangement of the two semiconductor lasers selected, the beam divider has at least two and preferably four reflecting surfaces. The reflecting surfaces are at right angles to one another and disposed at the same distance from the semitransparent mirror. In each case, they are inclined at an angle of 45° to the incident total primary beam bundle and protrude into the total beam bundle, such that a beam passage is formed for a portion of the total primary beam bundle. Due to the arrangement of the reflecting surfaces in the beam path of the primary light beam bundle, three partial beam bundles, extending perpendicularly to one another, can be easily produced. For example, the partial beam bundles, produced by the reflecting surfaces of the beam divider, form the orthogonal y and z axes. The portion of the total primary beam bundle, which is transmitted without hindrance, forms the x axis. For an arrangement of four reflecting surfaces, the total primary beam bundle is divided into a total of five partial beam bundles. In this way, "negative" sections of the y and z axes can also be produced. The Cartesian coordinate system of partial beam bundles, so produced, has a common virtual origin, which arises from the intersection of the extension of the partial beam bundles through the "points of incidence" of the total primary beam bundle on the reflecting surfaces. The portion of the total primary beam bundle, transmitted without hindrance, also strikes this point of intersection. By these means, a zero offset is avoided. The arrangement of the reflecting surfaces provides the prerequisite for a compact and robust construction of the optical element. This facilitates the mounting in the laser device and reduces the susceptibility of the beam divider to jarring.

In an alternative embodiment of the laser device for a laser sighting mechanism, the light-emitting surfaces of the semiconductor laser are disposed at an acute angle to one another. The beam divider has at least two and preferably four reflecting surfaces, which are at the same distance from the assigned semiconductor laser. Pairs of these surfaces, each enclose an angle of 90° with one another. The reflecting pair of surfaces is disposed at an angle of 45° to the incident primary beam bundle. In this embodiment, the semitransparent mirror is omitted. The light-emitting surfaces of the two semiconductor lasers are oriented towards the reflecting surfaces of the beam divider and, only at the beam divider, are superimposed to form a total beam bundle.

In a further alternative embodiment of the inventive laser arrangement, the light-emitting surfaces of the semiconductor lasers are aligned parallel to one another. The beam divider is formed by two prisms, which have longitudinal axes extending perpendicular to one another and are disposed with their two prism surfaces at an angle of 45° to the respective, assigned primary beam bundle. That prism, one of two plane parallel side surfaces of which is disposed in the vicinity of one of the prism surfaces of the second prism, has optically polished side surfaces. In this embodiment, the beam divider consists of two simple prisms, the reflecting prism surfaces of which enclose an angle of 90° at the prism edge facing the semiconductor laser. The prism, through which a deflected partial beam bundle must pass without being refracted, has optically polished, parallel side surfaces and a passage, extending from the edge of the prism to the base surface, for a middle region of the incident primary beam bundle. The manufacture of the prisms is simple and economically cost-effective. They are mounted and aligned relatively easily in the laser equipment. The prisms are robust and largely insensitive to shock.

For manufacturing reasons and to improve the robustness of the construction, the reflecting surfaces of the beam divider are combined with one another into a structural unit. For example, the two prisms can be assembled into a matched unit. In a particularly advantageous variation, the reflecting surfaces of the beam divider are constructed at a monolithic component. The component may, for example, have the configuration of a truncated pyramid, the surfaces of the pyramid extending at an angle of 90° to one another and at an angle of, for example, 45° to the perpendicular.

BRIEF DESCRIPTION OF THE INVENTION

For a more complete understanding of the present invention, and the advantages thereof, reference is now made to the following descriptions taken in conjunction with the accompanying drawings, in which.

DETAILED DESCRIPTION OF THE INVENTION

Figure 1:
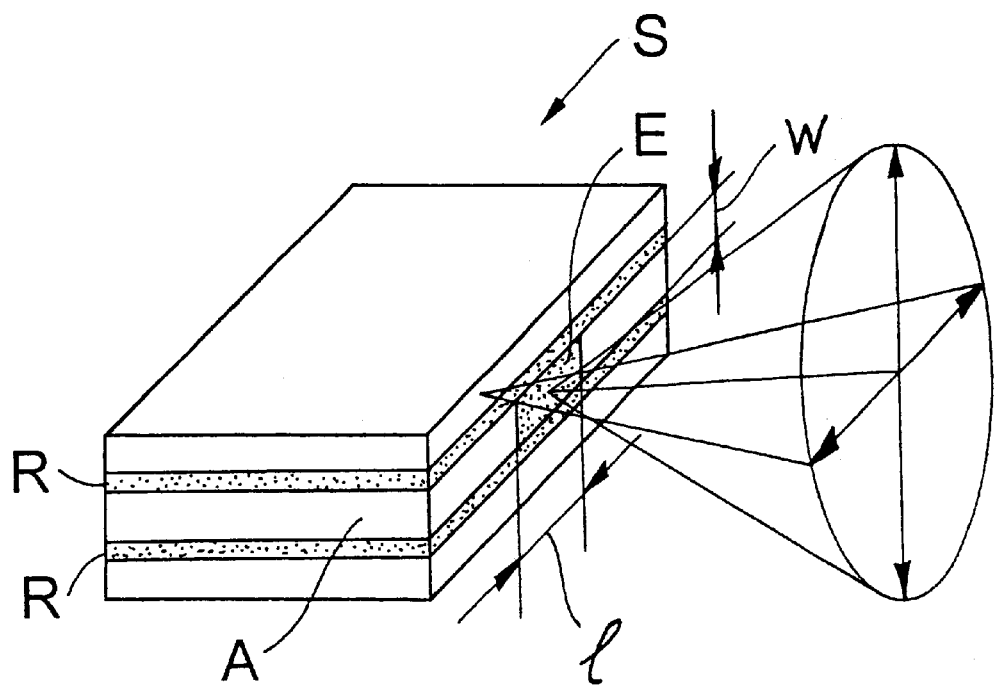
FIG. 1 illustrates a conventional semiconductor laser.

FIG. 1 shows a conventional commercial semiconductor laser S, which has a layered construction. In particular, an active layer A is disposed between two reflecting layers R, at which total reflection takes place. The light-emitting surface of the semiconductor laser S is labeled E. The light-emitting surface E has a rectangular shape with a longitudinal extent 1 and a transverse extent w. The ratio of the longitudinal extent 1 to the transverse extent w of the light-emitting surface E is about 2.5:1 to about 4:1. As a result of the asymmetry of the light-emitting surface E, the laser beam emitted has an elliptical cross section.

Figure 2:
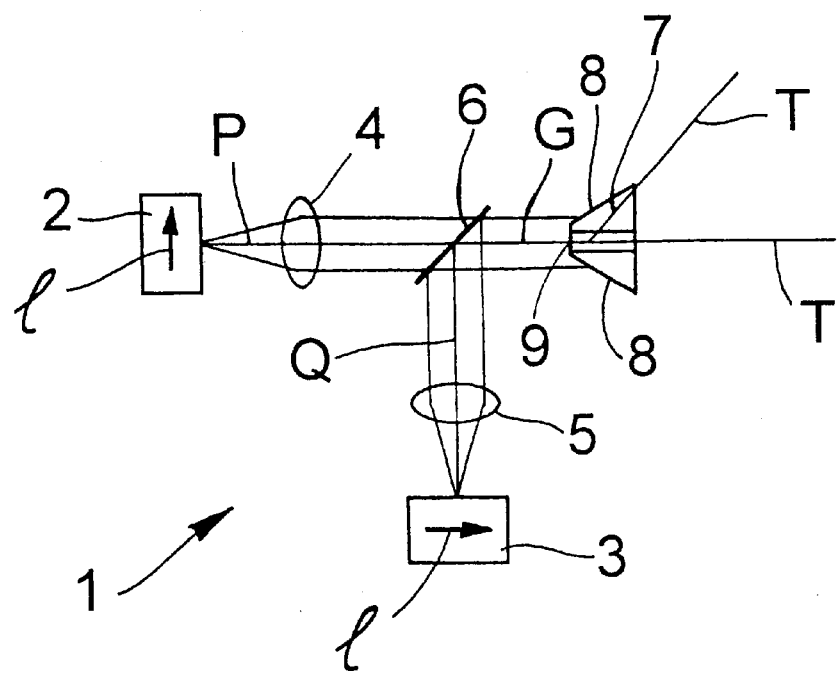
FIG. 2 illustrates an embodiment of a laser arrangement of the present invention.

In FIG. 2, a first laser arrangement 1 is shown, which may be disposed, for example, in a multi-beam laser sighting mechanism. The laser arrangement 1 comprises two semiconductor lasers 2 and 3, which are aligned perpendicularly to one another such that the longitudinal extents of their light-emitting surfaces are perpendicular to one another. This is indicated in FIG. 2 by the arrows 1, which are disposed perpendicularly to one another. The primary beam bundles P, Q, which are emitted by the laser light sources 2, 3, are passed through the collimator lenses 4, 5 and superimposed at a semitransparent mirror 6 to form a total primary beam bundle G.

Figure 3:
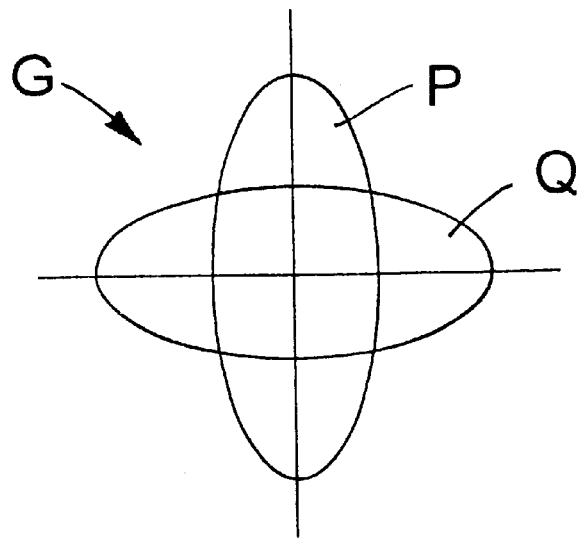
FIG. 3 illustrates a cross section of the course of the total primary beam G at the site of the superimposition 6 of FIG. 2, in accordance with the present invention.

The cross-sectional contour of the total primary beam bundle G at the site of the superimposition is indicated in FIG. 3. As shown, in FIG. 3, the two elliptical prirmary beam bundles P, Q are rotated at 90° to one another because of the arrangement, as shown in FIG. 2, which has been selected for the two semiconductor lasers 2, 3. The superimposing of the two elliptical primary beam bundles P, Q leads to a total beam bundle G, which has an essentially star-shaped cross section. The semitransparent mirror 6 is disposed at an angle of 45° to the two primary beam bundles P, Q.

The primary beam bundles P, Q, superimposed to form a total primary beam bundle G, are passed on to a beam divider 7, which is provided with reflecting surfaces 8 and a central passage borehole 9 for a central section of the total primary beam bundle G. Instead of a passage borehole 9, the beam divider can also be provided with plane parallel polished surfaces, through which the vertically striking portion of the primary beam bundle can pass without hindrance. The reflecting surfaces 8 are aligned at an angle of 90° to one another and inclined at an angle of 45° to the incident total primary beam bundle. For example, the beam divider 7 has the shape of a truncated pyramid with a square base surface and mirrored side surfaces. Because of the essentially star-shaped cross-sectional contour of the total primary beam bundle G, a partial section of a semi-ellipse is assigned to each reflecting side surface 8 of the truncated pyramid. The portion of the total beam bundle G, striking the reflecting surface 8, is deflected by 90° with respect to the direction of incidence. The central section of the superimposed total beam bundle G passes through the beam divider 7 essentially unhindered through the central passage opening 9. In the case of four reflecting surfaces 7, four partial beam bundles T, pairs of which extend perpendicularly to one another, can be produced. The central portion of the total. primary beam bundle extends perpendicularly to the deflected partial beam bundles T. In this manner, the Cartesian coordinate system, which has a common origin, can be produced.

Figure 4:
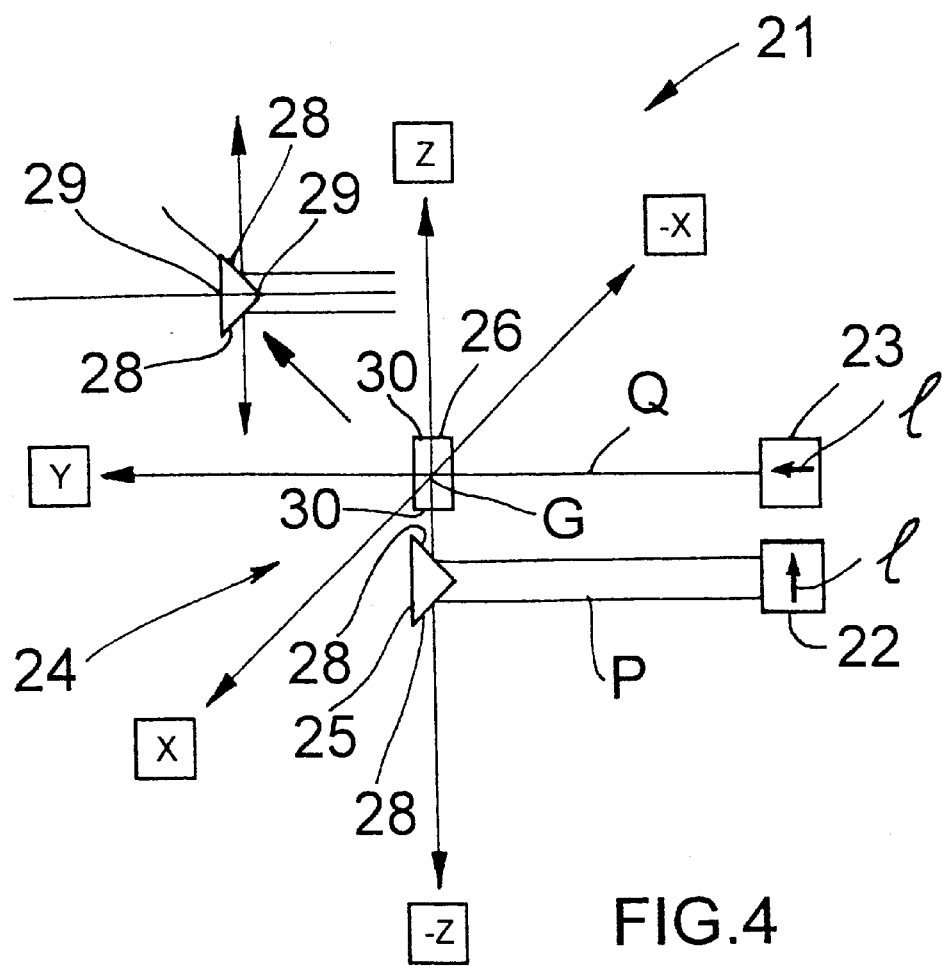
FIG. 4 illustrates an alternative embodiment of a laser arrangement of the present invention.

For the further alternative embodiment of the laser arrangement, which is shown in FIG. 4 and labeled 21 as a whole, two semiconductor lasers 22, 23 are disposed next to one another. Their light-emitting surfaces are aligned perpendicularly to one another, as indicated by the arrows 1, which extend perpendicularly to one another. The primary beams P, Q are directed onto a beam divider 24, which comprises two prisms 25, 26. Each prism 25 or 26 is in the beam path of a primary beam bundle P or Q. The first prism 25 is in the beam path of the first primary beam bundle P and has two reflecting surfaces 28, which extend at an angle of 45° to the first primary beam bundle P. As a result, the primary beam bundle P is split into two partial beam bundles along the [Z,-Z] X,-X axes, which are aligned with one another but spread out in opposite directions. The second prism 26, which is in the beam path of the second primary beam path Q, is disposed in the immediate vicinity of one of the reflecting surfaces of the first prism 25. The second prism 26 is rotated through 90° with respect to the first prism. Correspondingly, its reflecting surfaces 28 are also rotated by 90° with respect to those of the first prism 25. The second prism 26 has plane parallel, polished surfaces 29 at the prism edge and at the base surface. The side surfaces 30 of the second prism 26 are plane parallel and extend perpendicularly to the partial beam bundles along the [Z,-Z] X,-X axes, which are deflected by the first prism 25. The two side surfaces 30 form bundles along the [Z,-Z] X,-X axes, which are deflected by the first prism 25. The two side surfaces 30 form transmission surfaces for the deflected partial beam bundle along the [Z] X axis and are polished optically. The incident second primary beam bundle Q is deflected by 90° from the reflecting prism surfaces 28 of the second prism 26. This is indicated by the partial beam bundles along the X,-X axes, which extend perpendicularly to the partial beam bundles along the Z,-Z axes, deflected from the first prism 25. A portion of the second primary beam bundle Q passes through the prism 26 without hindrance through the plane parallel, polished surfaces 29 and forms a partial beam bundle along the Y axis, which extends perpendicularly to the remaining partial beam bundles along the Z,-Z axes. In this way, a Cartesian coordinate system with a common origin is produced.

The two semiconductor lasers of the laser arrangement offer the possibility of forming the axes of the Cartesian coordinate system with different intensities or also in different colors, by using semiconductor lasers with different outputs and/or wavelengths. Due to the inventive arrangement of the two semiconductor lasers, the elliptical beam shape of the primary beams is superimposed in an advantageous manner. By these means, the losses can be reduced clearly in conjunction with a beam divider of the type described, since the cross section of the incident laser beam bundle is approximated to the arrangement of the reflecting surfaces. By superimposing the two primary beams to form a total beam bundle, semiconductor lasers with low outputs can be used, as a result of which the economic efficiency of laser devices, equipped with the laser arrangement, is increased.

Although the present invention and its advantages have been described in detail, it is understood that various changes, substitutions and alterations can be made herein without departing from the spirit and scope of the invention.

What is claimed is:

1. A laser arrangement for a multi-beam laser sighting mechanism, which comprises a light source for producing at least one primary laser beam bundle and an optical beam divider with reflecting surfaces for splitting at least one primary laser beam bundle into at least two partial beam bundles, wherein the at least two partial beam bundles extend perpendicularly to one another and the light source comprises two semiconductor lasers with light-emitting surfaces each having a longitudinal extent and a transverse extent, wherein the longitudinal extent and the transverse extent are in a ratio of about 2.5:1 to about 4:1 to one another, wherein the longitudinal extents of the light-emitting surfaces are each rotated at an angle of 90° to one another and wherein the primary beam bundles produced by the two semiconductor lasers are superimposable at a position before or at the beam divider.

2. The laser arrangement of claim 1, wherein the two semiconductor lasers have different outputs.

3. The laser arrangement of claims 1, wherein the two semiconductor lasers emit two primary beam bundles of different wavelengths.

4. The laser arrangement of claim 1, wherein at least one beam-forming element is disposed at least between one of the semiconductors and the beam divider.

5. The laser arrangement claim 4, wherein the light-emitting surfaces of the semiconductor lasers are aligned parallel to one another and the beam divider is formed by two prisms, wherein the two prisms have longitudinal axes extending perpendicularly to one another and, with their two prism surfaces, are disposed at an angle of 45° to respectively assigned primary beam bundles, that prism, one of two plane parallel side surfaces of which is disposed in the vicinity of a prism surface of the other prism, having optically polished side surfaces and, at the prism edge and the base surface, plane parallel, polished surfaces, which extend perpendicularly to the side surfaces and are constructed for the passage of the middle region of the incident primary beam bundle.

6. The laser arrangement of claim 1, wherein the light-emitting surfaces of the semiconductor lasers are disposed perpendicularly to one another and the two emitting primary beam bundles can be superimposed to form a total primary beam bundle, wherein the two primary beam bundles are disposed at a semitransparent mirror and the semitransparent mirror is disposed between the semiconductor lasers and the beam divider and inclined at an angle of 45° to the direction of dispersion of the two primary beam bundles,.

7. The laser arrangement of claim 6, wherein the beam divider has at least two reflecting surfaces, which are disposed at right angles to one another and at the same distance from the semitransparent mirror and are each inclined at an angle of 45° to the total primary beam bundle and protrude into the total primary beam bundle such that a beam passage for a portion of the total primary beam bundle is formed.

8. The laser arrangement of claim 6, wherein the beam divider has four reflecting surfaces, which are disposed at right angles to one another and at the same distance from the semitransparent mirror and are each inclined at an angle of 45° to the total primary beam bundle and protrude into the total primary beam bundle such that a beam passage for a portion of the total primary beam bundle is formed.

9. The laser arrangement of claim 1, wherein the reflecting surfaces of the beam divider are combined with one another into a structural unit.

10. The laser arrangement of claim 9, wherein the reflecting surfaces of the beam divider are constructed at a monolithic component.

* * * * *